(12) United States Patent
Kaminski et al.

(10) Patent No.: US 8,688,108 B2
(45) Date of Patent: Apr. 1, 2014

(54) ANTENNA APPARATUS AND ANTENNA SELECTION METHOD

(75) Inventors: Stephen Kaminski, Eislingen (DE); Bozo Cesar, Stuttgart (DE); Uwe Doetsch, Freudental (DE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/509,293

(22) PCT Filed: Sep. 21, 2010

(86) PCT No.: PCT/EP2010/063843
§ 371 (c)(1),
(2), (4) Date: May 11, 2012

(87) PCT Pub. No.: WO2011/057840
PCT Pub. Date: May 19, 2011

(65) Prior Publication Data
US 2012/0231788 A1    Sep. 13, 2012

(30) Foreign Application Priority Data
Nov. 12, 2009   (EP) .................................... 09290859

(51) Int. Cl.
*H04W 4/00*   (2009.01)
(52) U.S. Cl.
USPC ........ 455/431; 455/117; 455/269; 455/188.1; 455/12.1; 343/705; 343/835; 343/745
(58) Field of Classification Search
USPC .............. 455/447, 566, 562.1, 524, 103, 450, 455/67.13, 431, 117, 269, 188.1, 12.1; 370/335, 336, 342, 280; 340/539.1, 340/539.13; 343/797, 705, 835, 745
See application file for complete search history.

(56) References Cited

U.S. PATENT DOCUMENTS

| 5,444,762 | A  |   | 8/1995  | Frey et al. |             |
|-----------|----|---|---------|-------------|-------------|
| 6,788,935 | B1 | * | 9/2004  | McKenna et al. | 455/431  |
| 7,132,989 | B1 |   | 11/2006 | Poilasne    |             |
| 7,146,147 | B1 | * | 12/2006 | Sabatino    | 455/300     |

(Continued)

FOREIGN PATENT DOCUMENTS

| CN | 101425622 A | 5/2009 |
| EP | 1 533 915 A1 | 5/2005 |

(Continued)

OTHER PUBLICATIONS

Sampath et al., "Application of the Helicopter Antenna Radiation Prediction Code (HARP) to modeling fixed wing aircraft," Antennas and Propagation Society IOnternational Symposium, IEEE, XP010132818, pp. 1376-1379, Jun. 28, 1993.

(Continued)

*Primary Examiner* — Mahendra Patel
(74) *Attorney, Agent, or Firm* — Fay Sharpe LLP

(57) ABSTRACT

The invention relates to a mobile telecommunication device (100) for establishing a telecommunication connection in the radio frequency range with a base station (102; 104; 1100), the mobile telecommunication device comprising; at least a first (106) and a second antenna (108), an electromagnetic shield (110) located between the first and the second antenna, a logic component (1000), wherein the first and the second antenna are adapted to transmit and receive telecommunication signals of the same frequency band, and wherein the logic component selects whether the first or the second antenna is used for the telecommunication connection with the base station.

20 Claims, 14 Drawing Sheets

(56) References Cited

U.S. PATENT DOCUMENTS

| | | | |
|---|---|---|---|
| 2004/0229607 A1* | 11/2004 | La Chapelle et al. | 455/431 |
| 2005/0001780 A1 | 1/2005 | Aisenbrey | |
| 2005/0124305 A1* | 6/2005 | Stichelbout | 455/117 |
| 2006/0030311 A1* | 2/2006 | Cruz et al. | 455/431 |
| 2006/0038736 A1 | 2/2006 | Hui et al. | |
| 2007/0030206 A1 | 2/2007 | Fontaine et al. | |
| 2007/0060212 A1* | 3/2007 | Shah | 455/572 |
| 2008/0248772 A1* | 10/2008 | Vlad et al. | 455/269 |
| 2009/0021434 A1* | 1/2009 | Lee et al. | 343/703 |
| 2009/0117322 A1 | 5/2009 | Larsen et al. | |

FOREIGN PATENT DOCUMENTS

| | | | |
|---|---|---|---|
| EP | 1 898 491 | A1 | 3/2008 |
| FR | 2 861 516 | A1 | 4/2005 |
| JP | 2002135020 | A | 5/2002 |
| JP | 2006173895 | A | 6/2006 |
| JP | 2008283391 | A | 11/2008 |
| WO | WO 00/51201 | A1 | 8/2000 |
| WO | 03103361 | A1 | 12/2003 |
| WO | WO 2005/002315 | A2 | 1/2005 |
| WO | 2008054935 | A1 | 5/2008 |
| WO | 2009088380 | A1 | 7/2009 |

OTHER PUBLICATIONS

English Bibliography for Japanese Patent App. Publication No. JP2008283391A, published Nov. 20, 2008, printed from Thomson Innovation on Oct. 17, 2013, 3 pp.

English Bibliography for Japanese Patent App. Publication No. JP2002135020A, published May 10, 2002, printed from Thomson Innovation on Oct. 17, 2013, 3 pp.

English Bibliography for Japanese Patent App. Publication No. JP2006173895A, published Jun. 29, 2006 printed from Thomson Innovation on Oct. 17, 2013, 3 pp.

TS 36.213, 3GPP, Technical Specification Group Radio Access Network; Evolved Universal Terrestrial Radio Acces (E-UTRA); Physical Layer Procedures, Release 8, V8.8.0, Sep. 2009, 77 pages.

English Bibliography for Chinese Patent Application Publication No. CN101425622A, published May 6, 2009, printed from Thomson Innovation on Dec. 19, 2013; 3 pp.

* cited by examiner

ANTENNA APPARATUS AND ANTENNA SELECTION METHOD

BACKGROUND OF THE INVENTION

For telecommunication in aircrafts, so called direct air-to-ground systems are used. Such systems provide a possibility for telecommunication connections from the aircraft to a base station on the ground. The Aircraft has a bidirectional communication link with the base station located on the ground. The radio signal transmitted by the base station in direction towards the aircraft is called the forward link. For the forward link, the transmission can be made more efficient by techniques like beamforming, in which the direction of emission of the radio signal is focussed and directed towards the receiving aircraft. The advantage is that other aircrafts which are located in the outer part of the lobe will receive less interference from such radio signals. The base station can additionally transmit with less power than would be necessary with omnidirectional transmission schemes.

On the contrary, the aircraft changes often its orientation and altitude. Hence, high efforts would be needed to implement a corresponding system into an aircraft in order to improve the reverse link for transmitting signals from the aircraft to the base station in the same way.

SUMMARY OF THE INVENTION

Embodiments of the invention provide a mobile telecommunication device for establishing a telecommunication connection in the radio frequency range with a base station.

It is the object of the invention to improve the mobile telecommunication of a mobile telecommunication device with a base station.

This invention applies to mobile communications systems like LTE, as defined in the corresponding 3GPP standards. The application in other mobile communications systems is not precluded.

According to embodiments of the invention the mobile telecommunication device comprises at least a first and a second antenna, an electromagnetic shield located between the first and the second antenna and a logic component. The shield has a first side facing the first antenna and a second side facing the second antenna. The electromagnetic shield reflects electromagnetic radiation impinging on the first side such that at least a portion of the radiation is reflected towards the first antenna and the electromagnetic shield reflects electromagnetic radiation impinging on the second side such that at least a portion of the radiation is reflected towards the second antenna. The first and the second antenna are adapted to transmit and receive telecommunication signals of the same frequency band. The logic component selects whether the first or the second antenna is used for the reverse link of the telecommunication connection with the base station. Reception of radio signals is normally always done by Rx diversity scheme, which automatically combines the received radio signals of both antennas.

Such mobile telecommunication device may for example be installed in an aircraft for establishing a telecommunication connection to a base station located on the ground. Therefore, the first antenna is located more to the rear of the aircraft while the second antenna is located more to the front of the aircraft. This means, the first side of the electromagnetic shield is directed towards the rear of the aircraft and the second side of the electromagnetic shield is directed to the front of the aircraft.

Thus, the first and the second antenna are arranged such that the antenna pattern of the first antenna has the highest antenna gain in backward direction of the aircraft. The antenna pattern of the second antenna has the highest antenna gain in forward direction of the aircraft. This is achieved by locating an electromagnetic shield between the first and the second antenna. Another possibility is to mount two distinct, separate antennas at locations on the surface of the aircraft that are located such that parts of the airplane, e.g. the fuselage itself or a wing or turbine forms the shield between the first and second antenna.

The electromagnetic shield prevents that signals transmitted by the first antenna are received by the second antenna and vice versa. Additionally, signals being received by the first antenna are received by the second antenna with a high attenuation and vice versa.

According to embodiments of the invention the electromagnetic shield is made of metal. The essential characteristic of the electromagnetic shield is that it has to be electro conductive. Thus, every kind of metal may be used for the electromagnetic shield including metal alloys.

According to embodiments of the invention the electromagnetic shield has a netting structure, the netting structure comprising metal. By using a netting structure for the electromagnetic shield the weight of the shield may be reduced and thereby also the weight of the mobile telecommunication device. The weight of the device is important when it is installed in an aircraft.

According to embodiments of the invention the electromagnetic shield is made of carbon fibers and metal. Preferably, the electromagnetic shield has a netting structure of carbon fibers and metal but also other structures of carbon fibers and metal may be applied, for example may the electromagnetic shield be made of carbon fibers with a metal plating.

According to embodiments of the invention the electromagnetic shield has a curved shape. This is advantageous because preferably omni directional antennas are used for the first and second antenna. Thus, the shape of the electromagnetic shield defines the transmission and receiving angle of the first and the second antenna. The use of omni directional antennas is advantageous because space can be saved by using omni directional antennas in comparison to the use of directional antennas.

For example, the electromagnetic shield may be curved in two dimensions. This means the electromagnetic shield has two surrounding elements. A first surrounding element surrounds the first antenna while a second surrounding element surrounds the second antenna.

Preferably, the electromagnetic shield is curved in all three dimensions. This means, the first antenna is surrounded partly in all three dimensions from the first surrounding element of the electromagnetic shield and the second antenna is surrounded partly in all three dimensions from the second surrounding element of the electromagnetic shield. In other words, the first and the second surrounding elements of the electromagnetic shield have the shape of a quarter sphere. The first and the second surrounding elements may also have the shape of a half sphere.

According to embodiments of the invention the electromagnetic shield is an aircraft fuselage. This means, that the first antenna is installed in the rear area of the aircraft and the second antenna is installed in the front part of the aircraft. The fuselage then functions as the electromagnetic shield because usually an aircraft fuselage comprises metal. In this case the first antenna is adapted for communicating with a base station behind of the aircraft while the second antenna is adapted for communication with a base station in front of the aircraft.

According to embodiments of the invention the logic component selects whether the first or the second antenna is used based on location information and/or measurements of signal power, signal quality, timing advance and/or Doppler shift of the first and the second antenna. The location information may for example be obtained from a global navigation satellite system signal, e.g. global positioning system (GPS) or Galileo. Preferably, the first antenna is adapted for communication with a base station located on the ground behind the aircraft. The second antenna is adapted for communication with a base station located on the ground in front of the aircraft. From the global navigation satellite system signal, which is usually always measured in an aircraft, the logic component knows the position and trajectory of the mobile telecommunication device. Further, the mobile telecommunication device may comprise a storage comprising a database with base station location information, for example in a data format according to a global navigation satellite system standard. This means, the database comprises location information of a plurality of base stations in a data format according to the data format of the global navigation satellite system being used in the aircraft. Preferably, the logic component knows the position and trajectory of the mobile telecommunication device from the global navigation satellite system signal and determines by reading from the database a base station on the ground being located nearest to the aircraft. Then, the logic component selects which antenna is to be used for the transmissions towards the base station during the establishment of the communication with the base station. In case a telecommunication connection is already established, the logic component knows the position and trajectory of the mobile telecommunication device from the global navigation satellite system signal and determines by reading from the database the base station on the ground with which the telecommunication connection is established.

If the base station is located in front of the aircraft the second antenna is used for the reverse link and if the base station is located behind the aircraft the first antenna is used for the reverse link.

Other data like the signal power, signal quality, timing advance and/or Doppler shift of the first and second antenna are measured by the logic component and considered for the selection which antenna to use. If, for example the signal power and the signal quality of the first antenna is higher than the signal power and the signal quality of the second antenna the first antenna is used for the reverse link. From the timing advance and the Doppler shift the moving direction of the aircraft relative to a base station can be derived. For example, when the Doppler shift is positive the airplane moves towards a base station while, if the Doppler shift is negative, the airplane departs from a base station.

A similar consideration is made for the timing advance. When the timing advance decreases the aircraft moves towards a base station while, if the timing advance increases, the aircraft departs from a base station. The timing advance may also be calculated based on location information derived from global navigation satellite system data.

According to embodiments of the invention the mobile telecommunication device further comprises a database in a storage, the database comprising location information about a plurality of base stations. The location information is stored in a data format readable by the logic component. The location information may for example be global navigation satellite system data.

According to embodiments of the invention the logic component receives a signal from a base station, the signal being indicative of the antenna to be used for the reverse link. This is advantageous, when the decision of which antenna is to be used is not made by the logic component but by the base station located on the ground.

If, for example the mobile telecommunication device is connected with the second antenna to a base station, while the first antenna measures a higher signal power and/or signal quality of another base station, the logic component decides if a handover shall be performed to the base station measured by the first antenna. The decision if a handover shall be performed can be based on the location information and/or measurements of signal power, signal quality, timing advance and/or Doppler shift of the first and the second antenna. If the logic component decides that a handover shall be performed, a measurement report is sent to the base station comprising data being important for the handover decision. The base station then sends a handover command to the mobile telecommunication device and the handover is performed according to 3GPP standard. During the handover the antenna of the mobile telecommunication device may also be changed from the first antenna to the second antenna or vice versa.

According to embodiments of the invention the logic component of the mobile telecommunication device is interconnected with a Global Navigation Satellite Service (GNSS) GPS or GALILEO. Usually, in an aircraft already exists a GNSS device. The trajectory can either be delivered by the GNSS device or can be easily calculated inside the logic component.

Based on the GNSS data and the locations of the base station stored in a database in a storage of the mobile telecommunication device, the logic component evaluates whether the aircraft moves towards (TO status) a base station or departs from a base station (FROM status). The logic component can autonomously select the antenna according to the following method:

In case of status TO, the second antenna is selected by the logic component.

In case of status FROM, the first antenna is selected by the logic component.

In case of a handover the antenna is switched according to the new status corresponding to the location of the target base station.

According to embodiments of the invention the mode for the antenna selection in case of transmission of sounding reference symbols remains unchanged compared to the 3GPP definitions for such sounding.

The decisions taken in the base station to perform such sounding based antenna switching can however be optimized for the application within direct air to ground communications systems by further criteria. It is to be noted that these criteria can be applied solitary and in various combinations of one or more of the criteria below.

Antenna selection is based on the current location and trajectory directly based on GNSS data and is performed by the logic component. This is normally done in airplanes anyway and the information can be provided to the logic component, or the logic component has its own GNSS receiver and calculates the location and trajectory on its own. Together with the database containing the locations of the antennas and their orientations and other radio parameters like maximum transmit power, the information can be evaluated, which of the antennas is selected best. In case the radio cell with the best expected radio conditions is located in forward direction, the front antenna is selected. In case the radio cell with the best expected radio conditions is located in backward direction, the rear antenna is selected.

The term radio signal power and/or signal quality in the following refers to a measured signal power and/or signal quality corresponding to a certain radio cell known to the logic component. The used value for the antenna selection process is assumed to be a value that is filtered over time, e.g. by averaging a certain amount of measurements or by an IIR filter or sliding window filter etc., to avoid that inaccuracies in the measurement invoke unwanted antenna selection. The same applies to all other values like timing advance or Doppler shift.

In case of a handover procedure, the radio signal power and/or signal quality of the forward link signal of the target radio cell is measured by the mobile telecommunication device on both antennas, front and rear. The antenna via which the reverse link radio signal is transmitted is selected for the association with the target radio cell that has the higher received radio signal strength of the forward link.

Timing advance criteria during a handover procedure:

Normally the timing advance information is not measured in the mobile telecommunication device. Instead, the logic component calculates the timing advance value based on location information or the timing advance value is delivered to the logic component from the base station. Before association to the target radio cell, no information from the source base station is available for the timing advance value of the target base station. During the association process the timing advance value is sent by the target base station to the mobile telecommunication device. How this timing advance value is used as an antenna switching criterion is described for the case without handover further below.

Doppler criteria, evaluated in the logic component:

If, during handover procedure, especially during the synchronisation to the target radio cell, the Doppler shift of the forward link signal of the target radio cell is positive—i.e. the frequency measured at the reception by the mobile telecommunication device of radio transmissions transmitted from the base station is higher than the expected frequency—the second antenna is selected. If the Doppler shift is negative, the first antenna is selected.

In case of normal operation, i.e. without a handover in progress:

Radio signal power and/or radio signal quality criteria are evaluated in the logic component as follows. The radio signal power and/or the signal quality of the forward link signal of the current radio cell is measured on both antennas, front and rear.

The one antenna is selected for transmission of the reverse link signal, that has the higher received radio signal quality and/or signal power of the forward link.

In another aspect the invention relates to a base station apparatus comprising telecommunication means for establishing a wireless telecommunication connection with a mobile telecommunication device. The base station apparatus is adapted to receive location information, signal power, signal quality, timing advance and/or Doppler shift of a radio signal transmitted from a wireless telecommunication device. Based on the location information, signal power, signal quality, timing advance and/or Doppler shift the base station apparatus selects whether the first or the second antenna of the wireless telecommunication device shall be used for the reverse link of the telecommunication connection. The base station apparatus transmits a signal to the mobile telecommunication device, the signal being indicative of which antenna is to be used by the mobile telecommunication device for transmissions during establishment of the wireless telecommunication connection.

According to embodiments of the invention the base station is adapted to determine the current location of a mobile communication device and/or performs measurements of signal power, signal quality, timing advance and/or Doppler shift of a radio signal transmitted from the wireless telecommunication device. The location of the mobile communication device can be determined for example by triangulation.

In another aspect the invention relates to a system comprising a mobile telecommunication device and a base station apparatus. The mobile telecommunication device comprises at least a first and a second antenna, an electromagnetic shield located between the first and the second antenna and a logic component. The shield has a first side facing the first antenna and a second side facing the second antenna. The electromagnetic shield reflects electromagnetic radiation impinging on the first side such that at least a portion of the radiation is reflected towards the first antenna and the electromagnetic shield reflects electromagnetic radiation impinging on the second side such that at least a portion of the radiation is reflected towards the second antenna. The first and the second antenna are adapted to transmit and receive telecommunication signals of the same frequency band. The logic component selects whether the first or the second antenna is used for the reverse link of the telecommunication connection with the base station.

The base station apparatus comprises telecommunication means for establishing a wireless telecommunication connection with a mobile telecommunication device. The base station apparatus is adapted to receive measurements of global navigation satellite system data, signal power and/or signal quality of a first and a second antenna from the mobile telecommunication device. From the global navigation satellite system data the location information can be derived. Based on the location information and measurements of signal power, signal quality, timing advance and/or Doppler shift the base station apparatus selects whether the first or the second antenna of the mobile telecommunication device shall be used for the reverse link of the telecommunication connection. The base station apparatus transmits a signal to the mobile telecommunication device, the signal being indicative of which antenna is to be used by the mobile telecommunication device for transmissions during establishment of the wireless telecommunication connection.

In yet another aspect the invention relates to a telecommunication method for establishing a telecommunication connection of a mobile telecommunication device. The method comprises the steps of:

determining location information, the location information can for example be global navigation satellite system data;
performing measurements of signal power, signal quality, timing advance and/or Doppler shift of a first and a second antenna of the mobile telecommunication device;
selecting whether the first or the second antenna is used for the reverse link of the telecommunication connection based on location information and/or measurements of signal power, signal quality, timing advance and/or Doppler shift of the first and the second antenna; and
the transmissions during establishment of a telecommunication connection to a first base station apparatus.

Preferably, this method is performed by the logic component in the mobile telecommunication device.

According to embodiments of the invention the mobile telecommunication device determines location information and measures signal power, signal quality, timing advance and/or Doppler shift of the first and the second antenna and the telecommunication device selects whether a first or a second antenna is used for the reverse link of the telecommunication connection. Preferably, the first antenna is used for the reverse link of the a telecommunication connection with a base station being located behind the mobile telecommunication device and the second antenna is used for a telecommunication connection with a base station being located in front of the mobile telecommunication device.

According to embodiments of the invention the mobile telecommunication device determines location information, while the method comprises a further step: sending the location information to the first base station. The first base station then selects whether the first or the second antenna is used for the telecommunication connection after having received the location information from the mobile telecommunication device, and/or after having performed measurements of the signal power, signal quality, timing advance and/or Doppler shift of a radio signal transmitted from the mobile telecommunication device. The first base station sends a first signal to the mobile telecommunication device, which is indicative of which antenna is to be used for the telecommunication connection.

The sent data may be comprised in an extended measurement report compared to the measurement report according to 3GPP standards. After having received the above mentioned data, the base station apparatus selects whether the first or the second antenna of the mobile telecommunication device is used for the reverse link of the telecommunication connection. The base station sends a first signal to the mobile telecommunication device, which is indicative of which antenna is to be used for the reverse link of the telecommunication connection.

According to embodiments of the invention the base station determines location information and/or measures the signal power, signal quality, timing advance and/or Doppler shift of a radio signal transmitted from the mobile telecommunication device. The method further comprises the step of: selecting whether the first or the second antenna is used for the telecommunication connection after having determined the location information, and/or having measured the signal power, signal quality, timing advance and/or Doppler shift of the radio signal transmitted from the mobile telecommunication device. The base station sends a second signal to the mobile telecommunication device, the second signal being indicative of which antenna is to be used for the telecommunication connection.

According to embodiments of the invention the base station sets a threshold for one of the measured signal properties and transmits this threshold to the mobile telecommunication device. The mobile telecommunication device then sends a signal to the base station, when this threshold is reached. Thus, the base station knows when a predefined threshold is reached and can then select which antenna of the base station shall be used for the reverse link or the base station can decide to perform a handover.

According to embodiments the Doppler shift measurement can be performed either for the reverse or for the forward link.

According to embodiments of the invention the method comprises further the steps of:
initiating a handover procedure from the first base station apparatus to a second
base station apparatus by transmitting a third signal to the second base station, the third signal being indicative of location information, signal power, signal quality and/or Doppler shift of the first and the second antenna;
transmitting a fourth signal from the first base station to the mobile telecommunication device, the fourth signal being indicative of performing a handover procedure from the first base station apparatus to the second base station apparatus.

The handover is then performed according to 3GPP standards. Thus, the logic component of the mobile telecommunication device decides when a handover shall be performed based on data being received by the antennas or from a global navigation satellite system. If the logic component decides to perform a handover the relevant data is sent to the base station, which then informs according to 3GPP standards the target base station of the handover procedure and sends a handover command to the mobile telecommunication device when the handover shall be performed.

The handover procedure may also be linked to a switching of the antenna. For example, when the mobile telecommunication device moves away from a first base station towards a second base station the first antenna may be used for the communication via the reverse link with the first base station while the second antenna is used for the communication via the reverse link with the second base station. When the handover from the first base station to the second base station is performed the logic component also switches from using the first antenna for the reverse link of the telecommunication connection to using the second antenna for the reverse link of the telecommunication connection.

According to embodiments of the invention the mobile telecommunication device measures the Doppler shift of the signal from the second base station. The measured Doppler shift is then transmitted from the mobile telecommunication device to the first base station. The first base station transmits the measured Doppler shift to the second base station. Thus, the second base station knows about the Doppler shift of a signal from the second base station to the mobile telecommunication device.

BRIEF DESCRIPTION OF THE DRAWINGS

In the following preferred embodiments of the invention will be described, by way of example only, and with reference to the drawings in which.

DETAILED DESCRIPTION

Like numbered elements in these Figs. are either identical elements or perform the same function. Elements which have been discussed previously will not necessarily be discussed in later FIG. 1f the function is identical.

Figure 1:
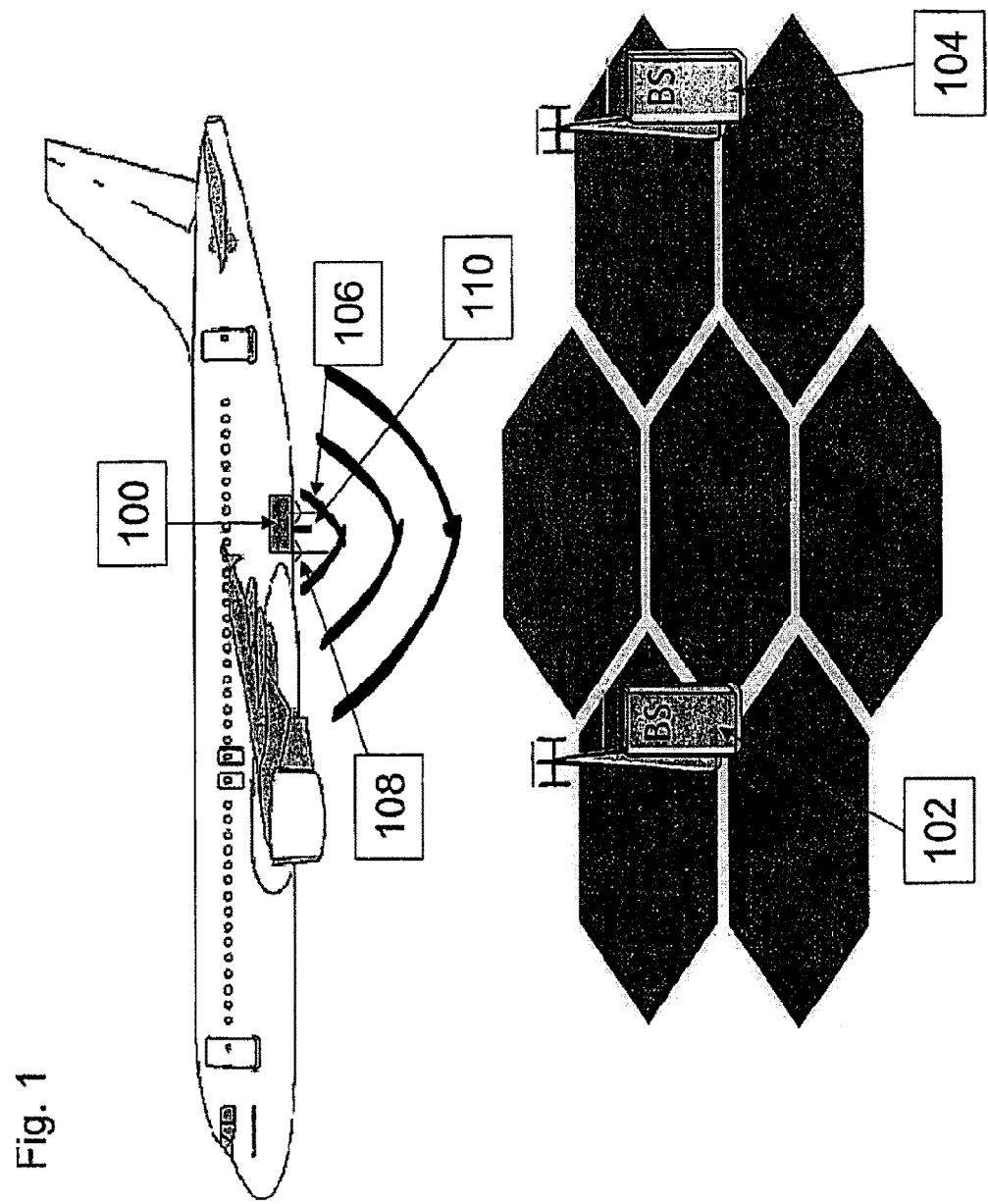
FIG. 1 is a schematic view of an aircraft comprising a mobile telecommunication device comprising two antennas, and two base stations on the ground.

FIG. 1 is a schematic view of a mobile telecommunication device 100 comprising two antennas 106 and 108 and one electromagnetic shield 110. The electromagnetic shield 110 is located between the two antennas 106 and 108. The first antenna 106 is adapted to transmit and receive signals to and from the rear direction of the aircraft while the second antenna 108 is adapted to transmit and receive signals to and from the front direction of the aircraft. Both antennas 106 and 108 are omnidirectional antennas, the direction of the signals is defined by their orientation with regard to the electromagnetic shield 110. Thus, in the moving direction of the aircraft the first antenna 106 is located behind the electromagnetic shield 110 and the second antenna 108 is located in front of the electromagnetic shield 110.

On the ground are located two base stations 102 and 104. Because both antennas 106 and 108 of the mobile telecommunication device transmit and receive signals in the same frequency band, both antennas 106 and 108 could communicate with both base stations 102 and 104. Because of the electromagnetic shield 110 between the antennas 106 and 108 a reverse link of the telecommunication connection is best possible of one antenna with one base station. Base station 102 is located such that the second antenna 108, which transmits and receives signals to and from the front direction of the aircraft can best be used for the reverse link with the base station 102. Base station 104 is located such that the first antenna 106, which transmits and receives signals to and from the rear of the aircraft can best be used for the reverse link with base station 104. Reception of radio signals is normally always done by Rx diversity scheme, which automatically combines the received radio signals of both antennas.

Thus, by measuring signal power, signal quality, Doppler shift and/or timing advance of both antennas, the logic component (not depicted) of the mobile telecommunication device 100 selects which antenna is best to be used for the reverse link of a telecommunication connection. Also global navigation satellite system data being recorded in the aircraft anyway can be used by the logic component to determine which base station is more likely for having a good telecommunication connection with the mobile telecommunication device.

Therefore, the mobile telecommunication 100 device may comprise a storage comprising a database with data representing information about the location of base stations. The logic component can then compare the location information of the aircraft with the data in the database and select the base station to communicate with. The location information may for example be data of a global navigation satellite system, which is usually always measured in an aircraft. Depending on the selection of the base station also the antenna is selected for the reverse link transmissions. For a communication with base station 104 the first antenna 106 would be selected and for a communication with base station 102 the second antenna 108 would be selected.

If the aircraft moves on and passes by base station 102 the signal power and signal quality received by the second antenna 108 will decrease with a high slope because the second antenna 108 is adapted only for communication with base stations lying in front of the aircraft. By switching the communication to the first antenna 106, the telecommunication connection with base station 102 is kept alive and the first antenna 106 is used for further communication with base station 102.

Figure 2:
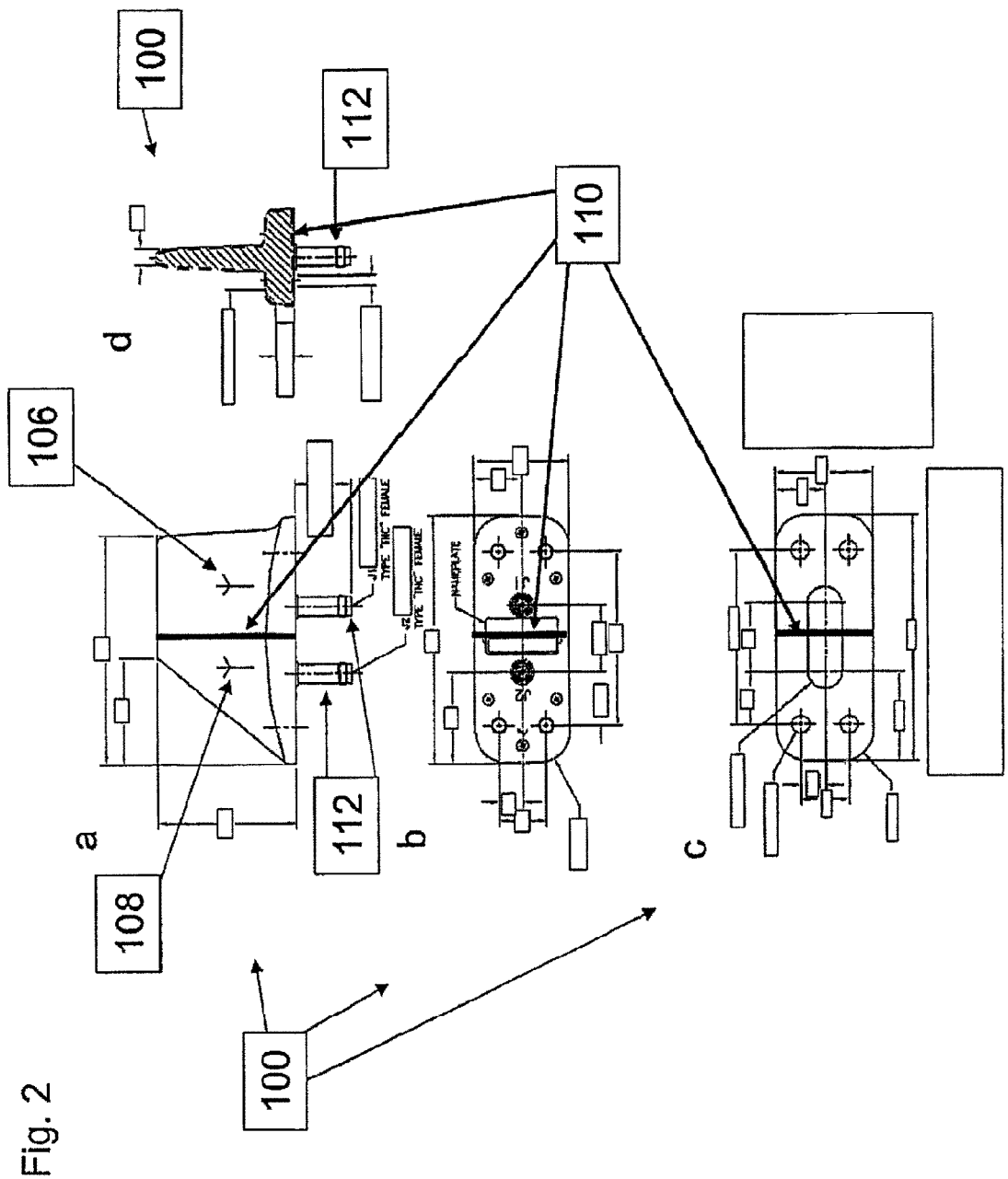
FIG. 2 is a schematic view of a mobile telecommunication device with two antennas and an electromagnetic shield.

FIG. 2 shows a schematic view of a mobile telecommunication device comprising a first antenna 106 and a second antenna 108 and an electromagnetic shield 110. FIG. 2a is a cross-sectional side view of the mobile telecommunication device 100. FIG. 2b is a schematic view from below the mobile telecommunication device 100, FIG. 2c is a view from above the mobile telecommunication device 100 and FIG. 2d is a cross-sectional front view of the mobile telecommunication device 100.

In FIG. 2a it can be seen that the two antennas 106 and 108 are separated by the electromagnetic shield 110 and that radiation transmitted by antenna 106 is received by antenna 108 with high attenuation and vice versa. Two BNC connectors 112 are adapted for connecting the antennas 106 and 108 to other electrical elements not depicted, for example a logic component. In FIGS. 2b and c the electromagnetic shield can be seen from below and above. In FIG. 2d the cross-section of the electromagnetic shield 110 is depicted. The electromagnetic shield 110 is at least as long as the first and the second antenna 106 and 108, preferably it is longer. Near the BNC connectors 112, the electromagnetic shield widens in the cross-section. This is for avoiding or decreasing overlap of the two main lobes of the antenna radiation characteristics.

Figure 3:
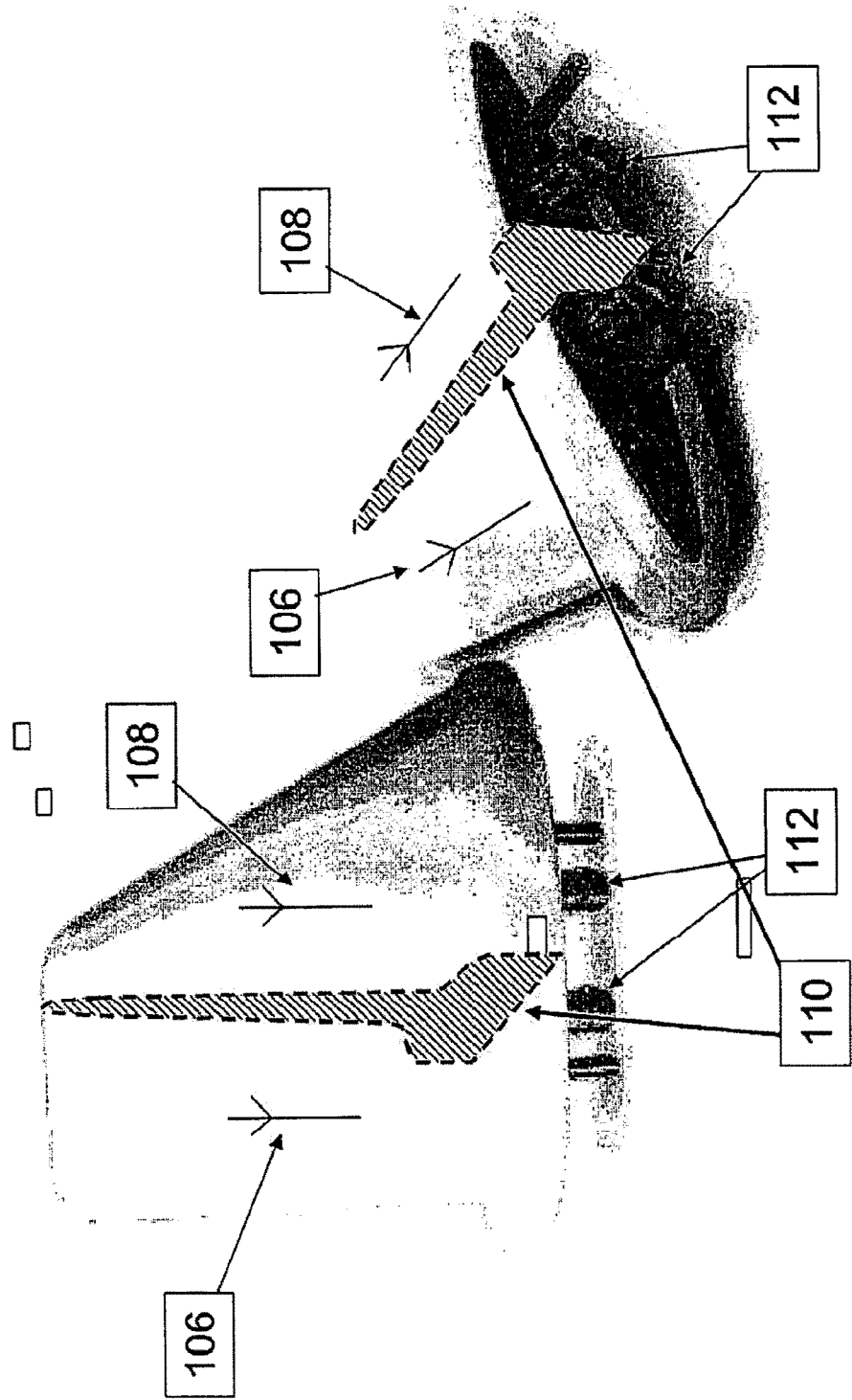
FIG. 3 is a schematic view of a mobile telecommunication device with two antennas and an electromagnetic shield in a housing.

FIG. 3 is a schematic view of two mobile telecommunication devices, each mobile telecommunication device comprising two antennas 106 and 108 and an electromagnetic shield 110, which widens near BNC connectors 112. One mobile telecommunication device stands on its BNC connectors 112. It is to be noted that the mobile telecommunication device is installed in an airplane inversely, which means with the BNC connectors to the top. The second mobile telecommunication device in FIG. 3 lies on its side. In operation the antennas 106 and 108 communicate on the same frequency band and signals transmitted or received to and from the first antenna 106 is shielded by the electromagnetic shield 110 from the second antenna 108 and signals transmitted or received to or from the second antenna 108 is shielded from the first antenna 106 by the electromagnetic shield 110. This results in the fact that the first antenna 106 is adapted for communicating in a first direction while the second antenna 108 is adapted for communicating in a second direction.

Figure 4:
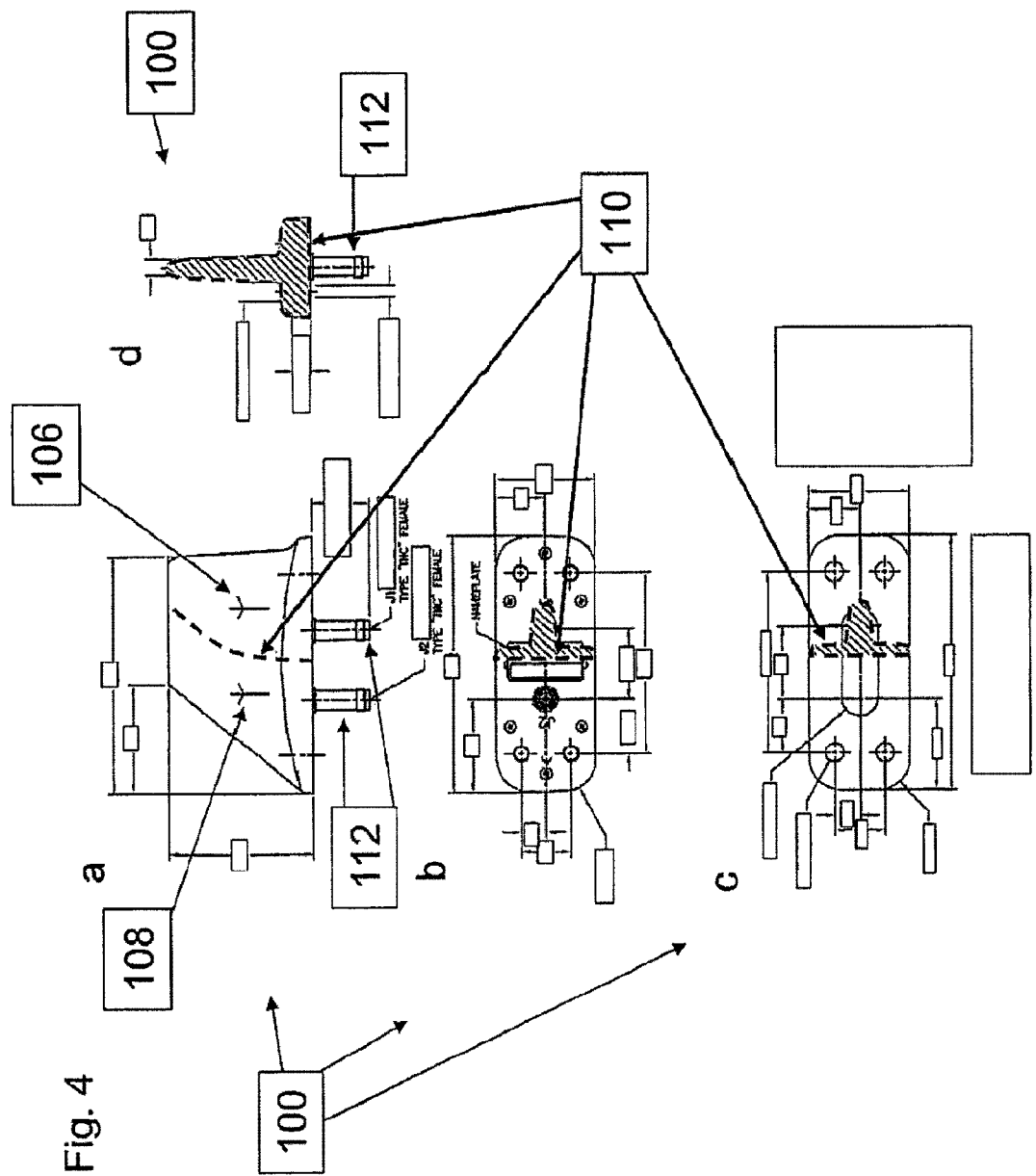
FIG. 4 is a schematic view of a mobile telecommunication device with two antennas and an alternative electromagnetic shield.

FIG. 4 shows a schematic view of a mobile telecommunication device comprising a first antenna 106 and a second antenna 108 and an electromagnetic shield 110. FIG. 4a is a cross-sectional side view of the mobile telecommunication device 100. FIG. 4b is a schematic view from below the mobile telecommunication device 100, FIG. 4c is a view from above the mobile telecommunication device 100 and FIG. 4d is a cross-sectional front view of the mobile telecommunication device 100.

In FIG. 4a it can be seen that the two antennas 106 and 108 are separated by the electromagnetic shield 110 and that radiation transmitted by antenna 106 is received by antenna 108 with high attenuation and vice versa. Two BNC connectors 112 are adapted for connecting the antennas 106 and 108 to other electrical elements not depicted, for example a logic component. In FIGS. 4b and c the electromagnetic shield can be seen from below and above. In FIG. 4d the cross-section of the electromagnetic shield 110 is depicted. The electromagnetic shield 110 is at least as long as the first and the second antenna 106 and 108, preferably it is longer. Near the BNC connectors 112, the electromagnetic shield widens in the cross-section. This is for modifying radiation characteristics of the antennas 106 and 108 in different ways.

FIG. 4a shows the curved shape of the electromagnetic shield 110. The electromagnetic shield 110 is curved into the direction of antenna 106 such that it surrounds antenna 106 in two dimensions. An additional curvature into a third dimension is also possible (but not depicted) and part of other embodiments of the invention. Then, antenna 106 is surrounded in all three dimensions of electromagnetic shield 110 and the radiating angle is limited severely by the electromagnetic shield 110. Thus, a curvature in all three dimensions improves antenna gain and signal radiation direction.

Figure 5:
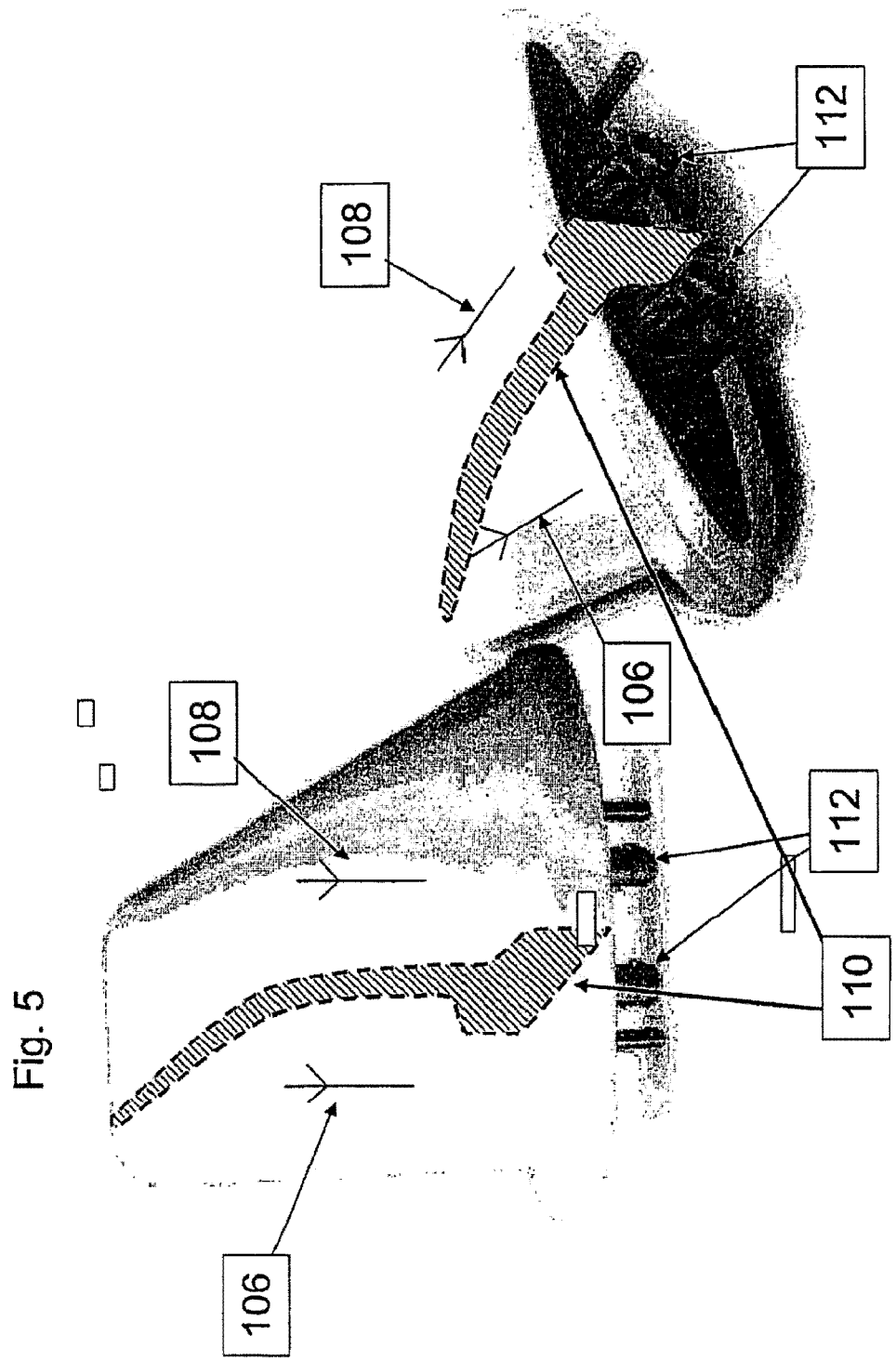
FIG. 5 is a schematic view of a mobile telecommunication device with two antennas and a curved electromagnetic shield.

FIG. 5 is a schematic view of two mobile telecommunication devices, each mobile telecommunication device comprising two antennas 106 and 108 and an electromagnetic shield 110, which widens near BNC connectors 112. One mobile telecommunication device stands on its BNC connectors 112. It is to be noted that the mobile telecommunication device is installed in an airplane inversely, which means with the b and c connectors to the top. The second mobile telecommunication device in FIG. 5 lies on its side. In operation the antennas 106 and 108 communicate on the same frequency band and signals transmitted or received to and from the first antenna 106 is shielded by the electromagnetic shield 110 from the second antenna 108 and signals transmitted or received to or from the second antenna 108 is shielded from the first antenna 106 by the electromagnetic shield 110. This results in the fact that the first antenna 106 is adapted for communicating in a first direction while the second antenna 108 is adapted for communicating in a second direction.

In FIG. 5 the electromagnetic shield 110 is curved such that it surrounds antenna 106 in two dimensions. An additional curvature into a third dimension is also possible (but not depicted) and part of other embodiments of the invention. Then, antenna 106 is surrounded in all three dimensions of electromagnetic shield 110 and the radiating angle is limited severely by the electromagnetic shield 110. Thus, a curvature in all three dimensions improves antenna gain and signal direction differently for the two antennas 106 and 108.

Figure 6:
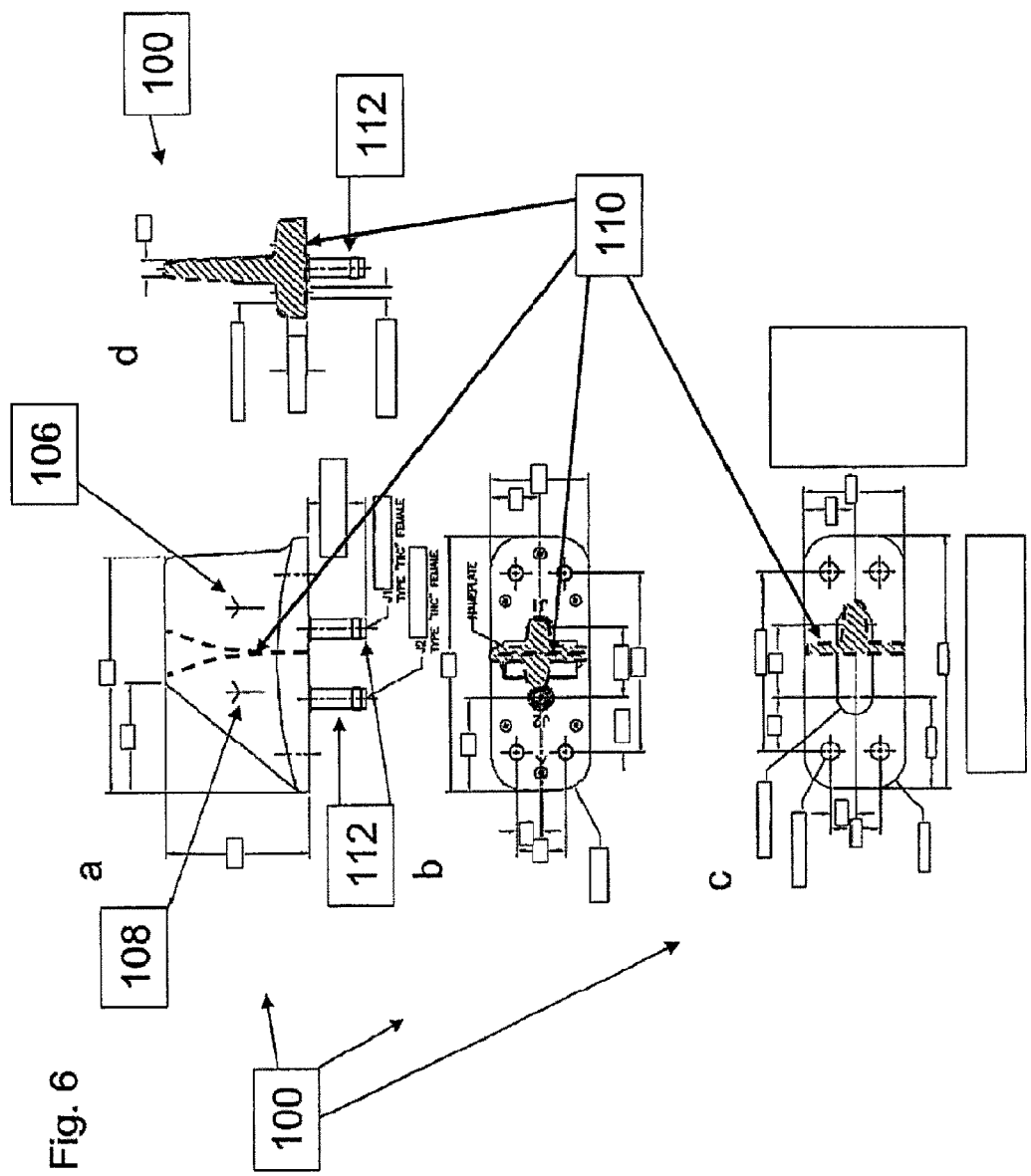
FIG. 6 is a schematic view of a mobile telecommunication device with two antennas and an electromagnetic shield curved in two directions.

FIG. 6 shows a schematic view of a mobile telecommunication device comprising a first antenna 106 and a second antenna 108 and an electromagnetic shield 110. FIG. 6a is a cross-sectional side view of the mobile telecommunication device 100. FIG. 6b is a schematic view from below the mobile telecommunication device 100, FIG. 6c is a view from above the mobile telecommunication device 100 and FIG. 6d is a cross-sectional front view of the mobile telecommunication device 100.

In FIG. 6a it can be seen that the two antennas 106 and 108 are separated by the electromagnetic shield 110 and that radiation transmitted by antenna 106 is received by antenna 108 with high attenuation and vice versa. Two BNC connectors 112 are adapted for connecting the antennas 106 and 108 to other electrical elements not depicted, for example a logic component. In FIGS. 6b and c the electromagnetic shield can be seen from below and above. In FIG. 6d the cross-section of the electromagnetic shield 110 is depicted. The electromagnetic shield 110 is at least as long as the first and the second antenna 106 and 108, preferably it is longer. Near the BNC connectors 112, the electromagnetic shield widens in the cross-section. This is for avoiding interferences.

FIG. 6a shows the curved shape of the electromagnetic shield 110. The electromagnetic shield 110 is shaped such that two surrounding elements of the electromagnetic shield 110 surround antennas 106 and 108 respectively in two dimensions. An additional curvature into a third dimension is also possible (but not depicted) and part of other embodiments of the invention. Then, antennas 106 and 108 are surrounded in all three dimensions of electromagnetic shield 110 and the radiating angle is limited severely by the electromagnetic shield 110. Thus, a curvature in all three dimensions improves antenna gain and signal direction.

Figure 7:
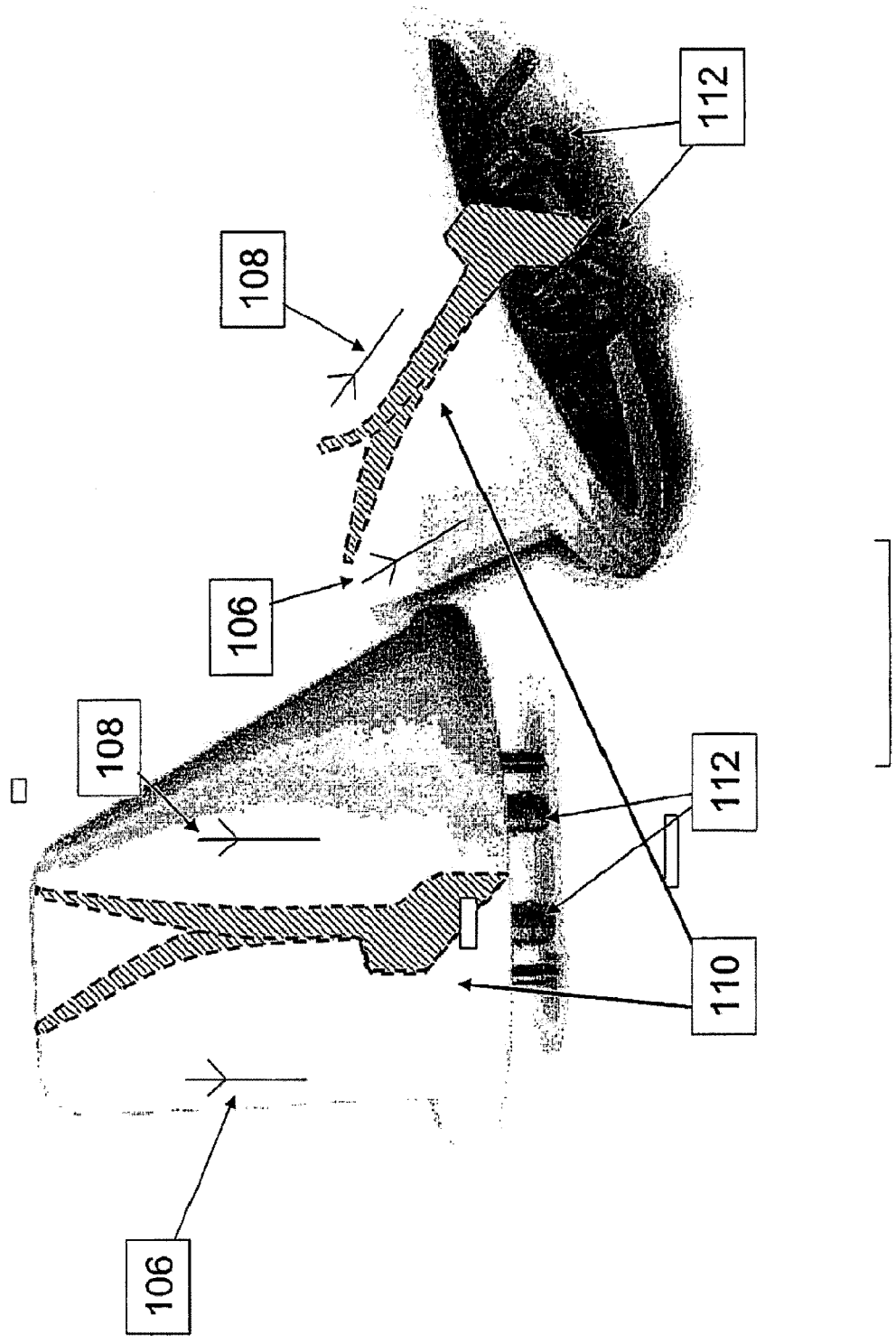
FIG. 7 is a mobile telecommunication device with two antennas and an electromagnetic shield curved in two directions.

FIG. 7 is a schematic view of two mobile telecommunication devices, each mobile telecommunication device comprising two antennas 106 and 108 and an electromagnetic shield 110, which widens near BNC connectors 112. One mobile telecommunication device stands on its BNC connectors 112. It is to be noted that the mobile telecommunication device is installed in an airplane inversely, which means with the b and c connectors to the top. The second mobile telecommunication device in FIG. 7 lies on its side. In operation the antennas 106 and 108 communicate on the same frequency band and signals transmitted or received to and from the first antenna 106 is shielded by the electromagnetic shield 110 from the second antenna 108 and signals transmitted or received to or from the second antenna 108 is shielded from the first antenna 106 by the electromagnetic shield 110. This results in the fact that the first antenna 106 is adapted for communicating in a first direction while the second antenna 108 is adapted for communicating in a second direction.

In FIG. 7 the electromagnetic shield 110 is curved such that two surrounding elements of the electromagnetic shield 110 surround antennas 106 and 108 respectively in two dimensions. An additional curvature into a third dimension is also possible (but not depicted) and part of other embodiments of the invention. Then, antennas 106 and 108 are surrounded in all three dimensions of electromagnetic shield 110 and the radiating angle is limited severely by the electromagnetic shield 110. Thus, a curvature in all three dimensions avoids or decreases overlap of the two main lobes of the antenna radiation characteristics and further improves antenna gain and signal direction differently for the two antennas 106 and 108.

Figure 8:
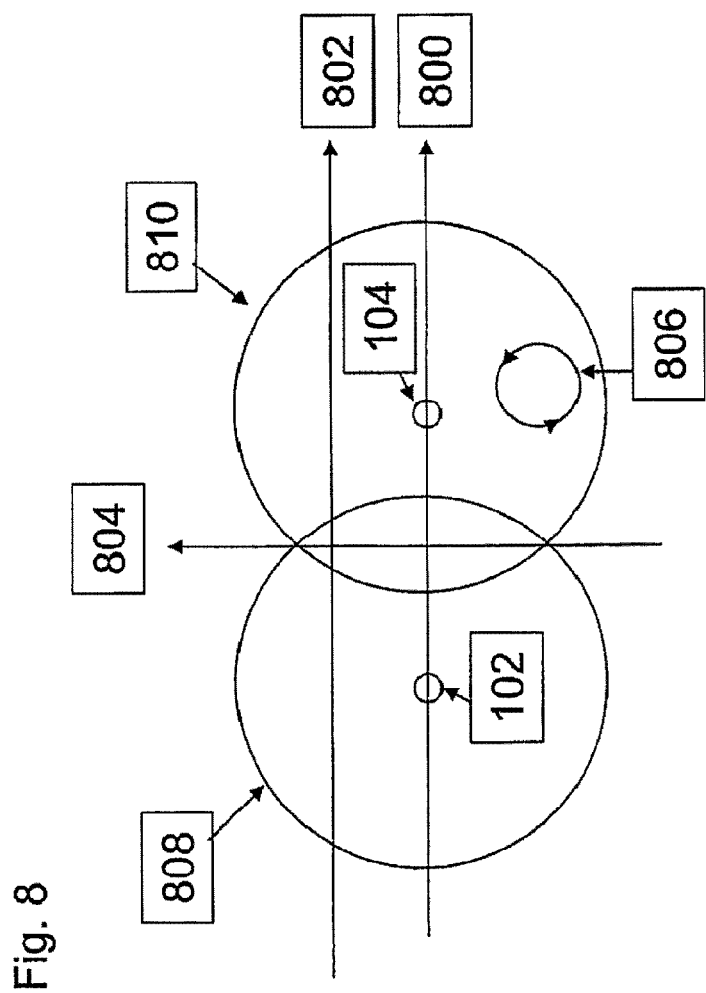
FIG. 8 is a schematic view of two base stations and the corresponding coverage area and four moving directions of an aircraft.

FIG. 8 is a diagram of four exemplary airplane trajectories 800, 802, 804 and 806. Each trajectory leads through a first cell 808 and a second cell 810. First cell 808 is served by first base station 102 and second cell 810 is served by second base station 104. On trajectory 800 the aircraft flies directly over first base station 102 and afterwards over the second base station 104. Following trajectory 802 the aircraft flies first through cell 808 served by base station 102 and afterwards through cell 810 served by base station 104. Trajectory 804 leads through the area in between the two base stations 102 and 104 through an overlapping area of the two cells 808 and 810. Trajectory 806 is a circle trajectory, which is performed for example by an aircraft waiting for landing permission. The trajectory 806 lies completely in the second cell 810 served by the second base station 104.

Figure 9:
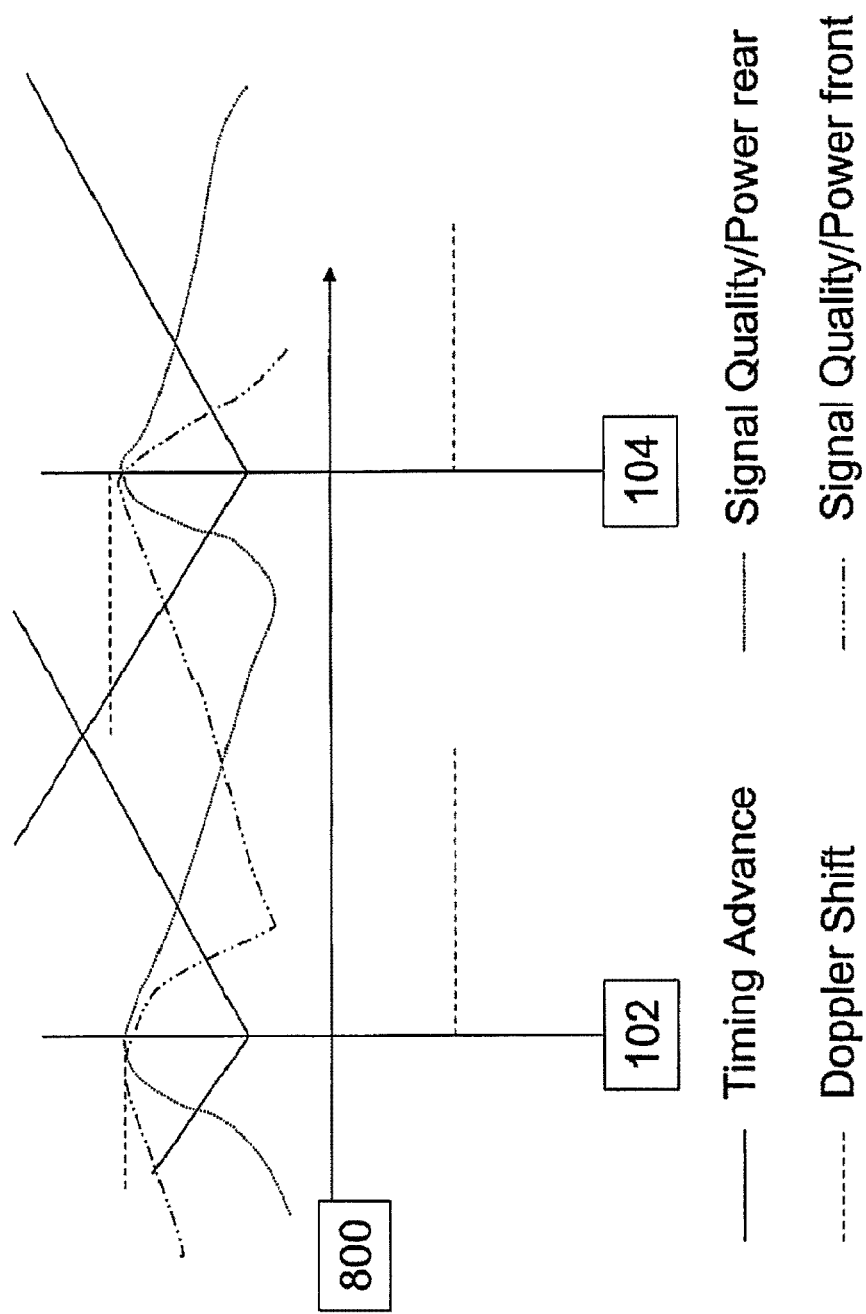
FIG. 9 is a diagram of timing advance, Doppler shift, signal quality/power of the two antennas.

FIG. 9 shows the timing advance, the signal quality and power of the rear antenna, the Doppler shift and the signal quality and power of the front antenna of an aircraft following trajectory 800 depicted in FIG. 8. Trajectory 800 passes by directly over base stations 102 and 104. It is to be noted that from every data depicted in FIG. 9 the point when base station 102 or base station 104 are traversed can be determined.

For example, the timing advance decreases when the aircraft moves towards a base station, the timing advance increases when the aircraft departs from a base station. The Doppler shift is positive when moving towards a base station and it is negative when departing from a base station. The signal quality and power from the rear antenna is lower than the signal quality and power from the front antenna when moving towards a base station and vice versa when departing from a base station.

Figure 10:
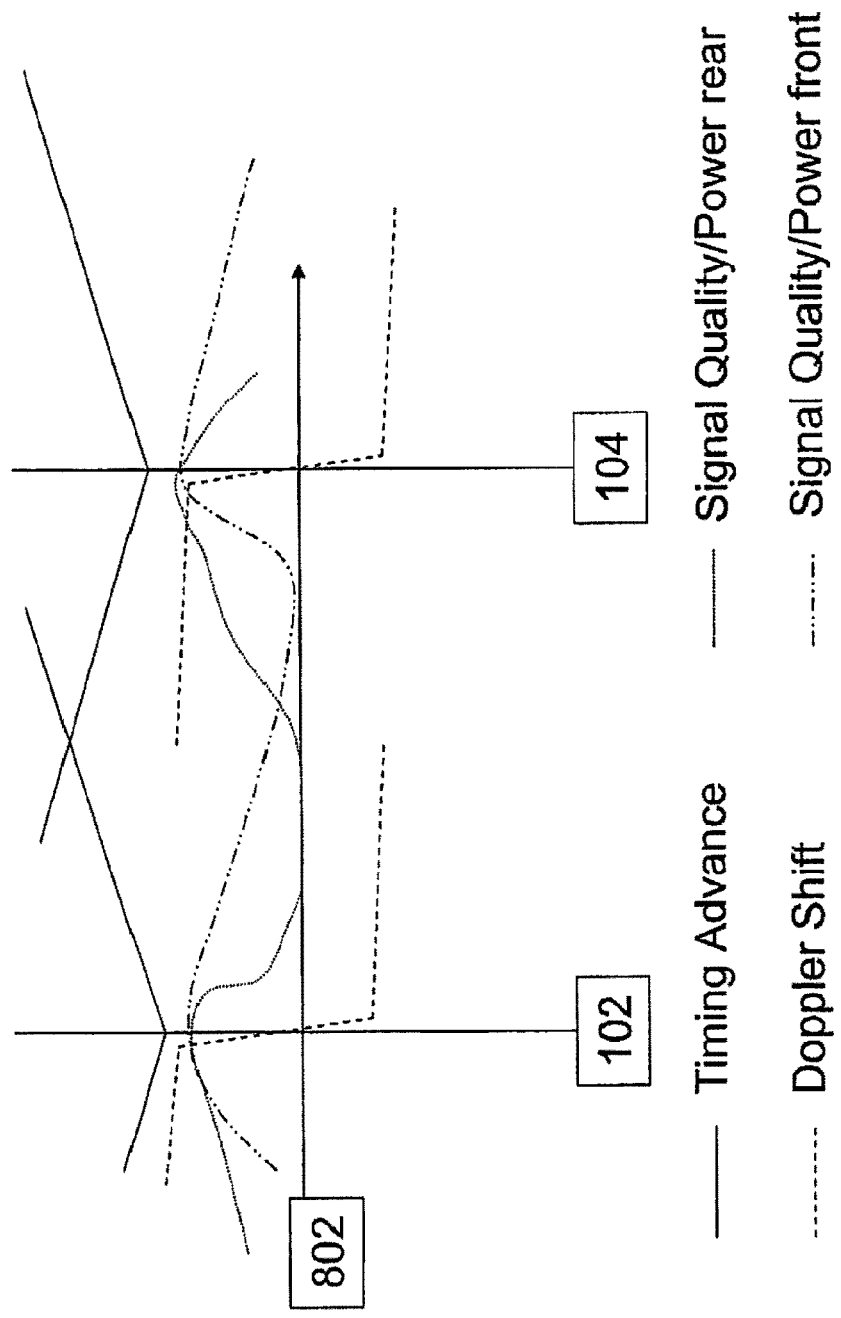
FIG. 10 is a diagram of timing advance, Doppler shift, signal quality/power of the two antennas for an alternative trajectory of an aircraft.

FIG. 10 is a diagram of signal quality and power of the rear and front antenna, the timing advance and the Doppler shift for an aircraft being on trajectory 802 depicted in FIG. 8. The Doppler shift is positive but decreasing in contrast to FIG. 9 when the aircraft shortens the distance between itself and the base station 102 or 104. Because trajectory 802 does not lead directly over the base stations 102 and 104, the Doppler shift does not shift immediately when being near base station 102. The Doppler shift is constantly decreasing, in a region near base stations 102 or 104 rapidly decreasing in comparison to the rest of the trajectory. The timing advance develops similar to FIG. 9 but with a lower slope because trajectory 802 does not lead directly over base stations 102 and 104. Signal quality and power of the rear and front antenna also develop similar to FIG. 9. Again one can easily determine from the measured signals when the aircraft passes by a base station and when the telecommunication connection is to be switched from one antenna to the other one. For example the Doppler shift becomes negative when passing by a base station and the rear antenna shall be used, the timing advance increases when the rear antenna shall be used and decreases when the front antenna shall be used. For deciding based on the signal quality and/or the signal power a simple comparison of the two values of the rear antenna with the two values of the front antenna makes obvious which antenna is to be used best.

Figure 11:
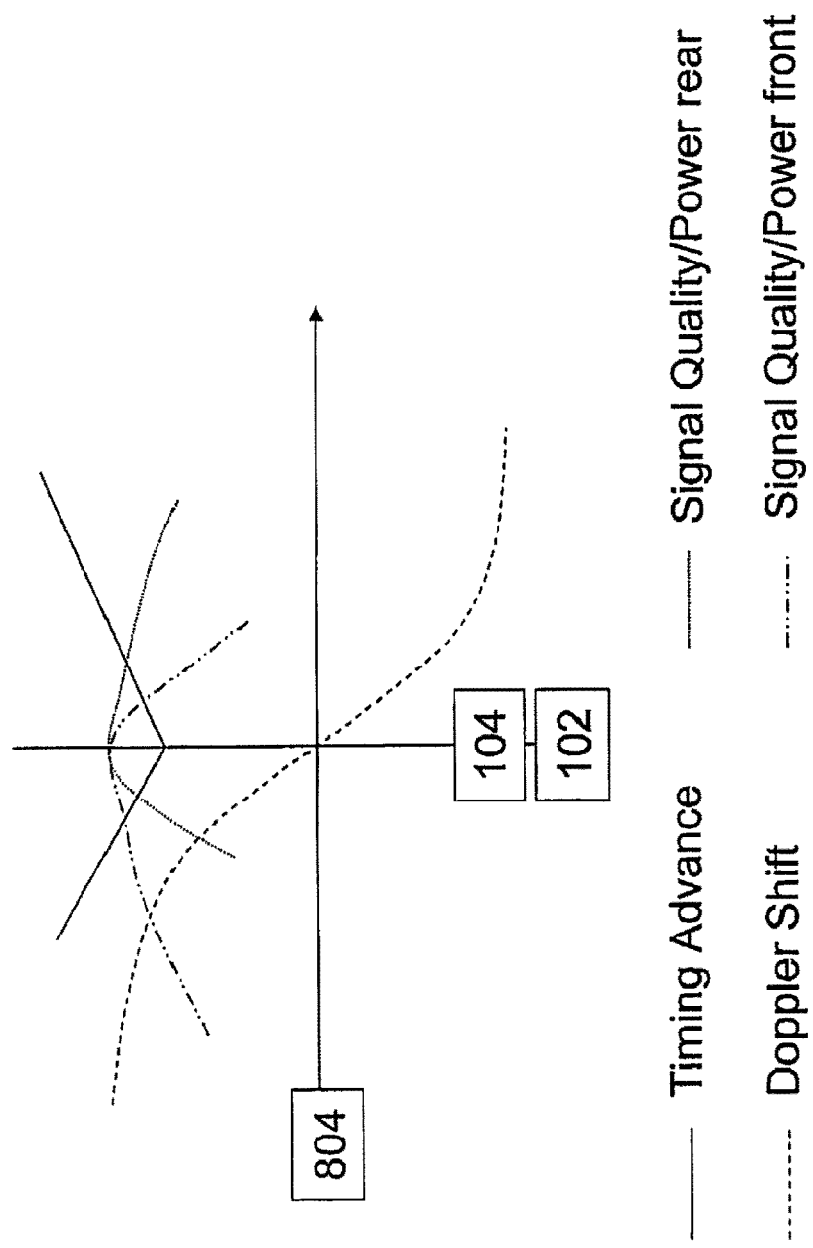
FIG. 11 is a diagram of timing advance, Doppler shift, signal quality/power of the two antennas of a third trajectory of an aircraft.

FIG. 11 shows measured data from an aircraft following trajectory 804 depicted in FIG. 8. Trajectory 804 leads only through the area which is covered by both base stations 102 and 104. The aircraft passes by base stations 102 and 104 at the same time. Throughout the whole trajectory timing advance, signal quality/power of the rear antenna, Doppler shift and signal quality/power of the front antenna are measured. The Doppler shift again is constantly decreasing and becomes negative when the aircraft has passed by the base stations 102 and 104, the signal quality and the signal power of the rear antenna increase with a high slope when approaching the base stations 102 and 104 and decreases when departing from the base stations 102 and 104. The signal quality and the signal power of the front antenna increase with a high slope when departing from the base stations 102 and 104. The timing advance decreases when approaching base stations 102 and 104 and increases when departing from base stations 102 and 104. Again, one can easily see, as in FIGS. 9 and 10, how to determine when to switch the antenna to be used for the radio frequency telecommunication.

Figure 12:
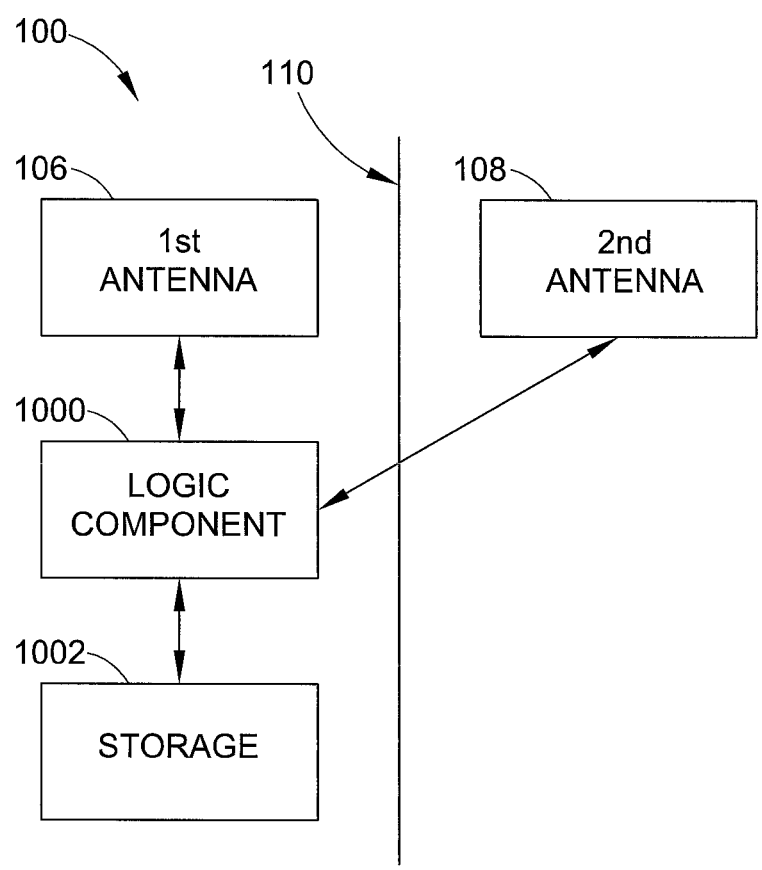
FIG. 12 is a block diagram of a mobile telecommunication device.

FIG. 12 is a block diagram of a mobile telecommunication device 100 comprising a first antenna 106, a second antenna 108, an electromagnetic shield 110, a logic component 1000 and a storage 1002. In operation, the first and the second antenna 106 and 108 are adapted to communicate on the same radio frequency band. They, for example communicate with a base station apparatus. The logic component is adapted to receive signals from the first and the second antenna 106 and 108 and to read from storage 1002. Further, logic component 1000 determines, which antenna shall be used for the reverse link of the telecommunication connection.

Figure 13:
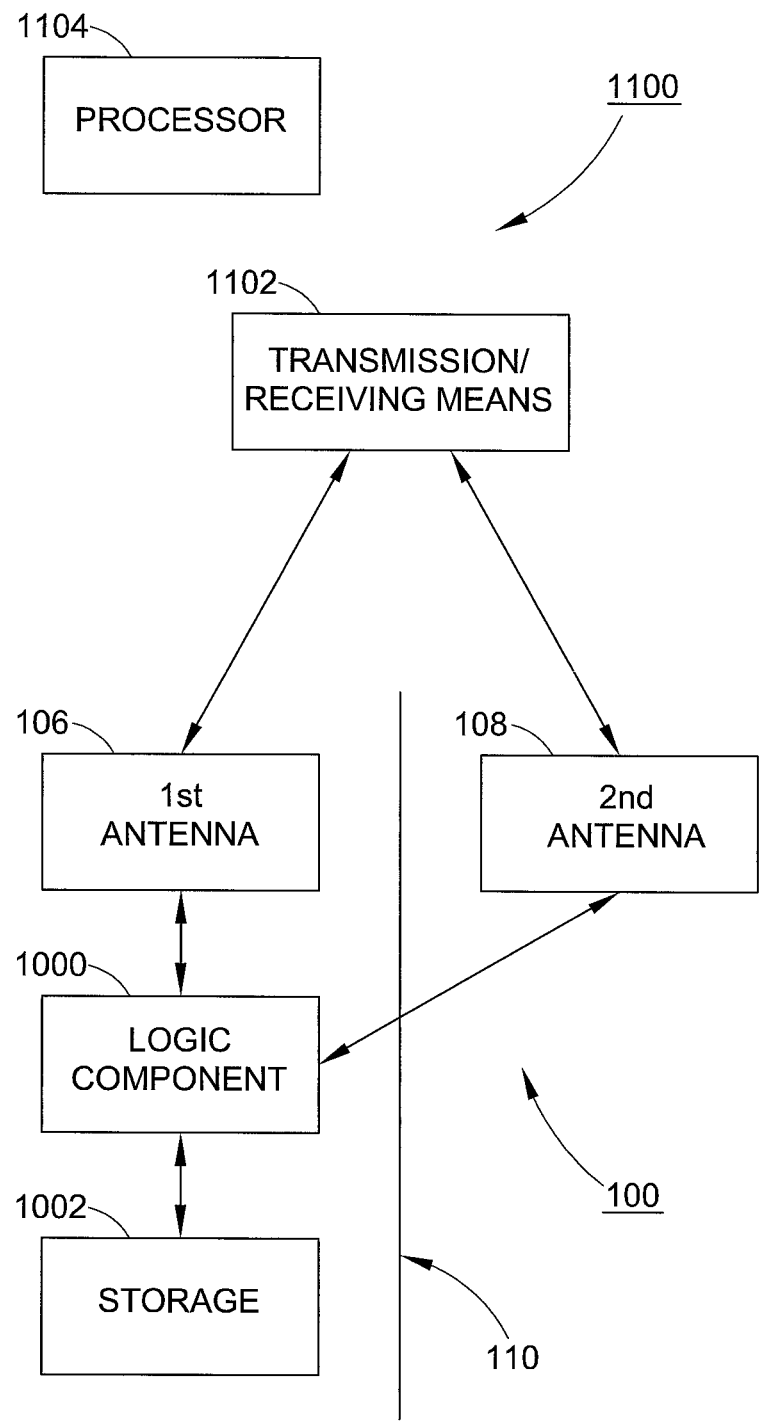
FIG. 13 is a block diagram of a system comprising a mobile telecommunication device and a base station.

FIG. 13 shows a system comprising base station 1100 and mobile telecommunication device 100. The mobile telecommunication device 100 comprises first antenna 106, second antenna 108, electromagnetic shield 110, logic component 1000 and storage 1002. Storage 1002 may comprise a database being indicative of locations of base stations.

Base station 1100 comprises transmission and receiving means 1102 for communication with mobile telecommunication device 100 and a processor 1104. In operation, the mobile telecommunication device transmits data being indicative for switching antenna or performing a handover to another base station via first antenna 106 or second antenna 108 to the transmission and receiving means 1102 of the base station 1100. Processor 1104 then reads the received data and determines if a handover shall be performed or if the other antenna currently not used shall be used for the reverse link of the telecommunication connection.

Figure 14:
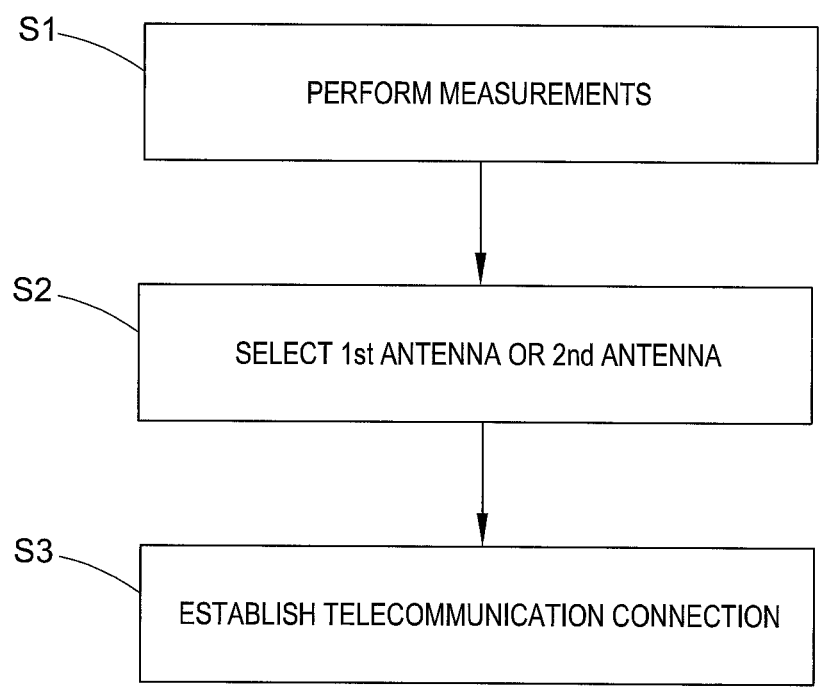
FIG. 14 is a block diagram illustrating a method of antenna switching.

FIG. 14 is a block diagram of a method, the method comprising the steps of:
S1: performing measurements of global navigation satellite system data, signal power, signal quality, timing advance and/or Doppler shift of a first and a second antenna of the mobile telecommunication device;
S2: selecting whether the first or the second antenna is used for the telecommunication connection based on measurements of signal power, signal quality, timing advance and/or Doppler shift of the first and the second antenna; and
S3: establishing a telecommunication connection to a first base station apparatus.

| List of reference numerals | |
| --- | --- |
| 100 | Mobile telecommunication device |
| 102 | First base station |
| 104 | Second base station |
| 106 | First antenna |
| 108 | Second antenna |
| 110 | Electromagnetic shield |
| 800 | Trajectory |
| 802 | Trajectory |
| 804 | Trajectory |
| 806 | Trajectory |
| 808 | First cell |
| 810 | Second cell |
| 1000 | Logic component |
| 1002 | Storage |
| 1100 | Base station |
| 1102 | Transmission and receiving means |
| 1104 | processor |

The invention claimed is:

1. A mobile telecommunication device for use on an aircraft, comprising:
at least first and second antennas configured to communicate with one or more base station, wherein the first and second antennas are configured to be positioned on the aircraft with the second antenna located more to a front part of the aircraft than the first antenna, and
an electromagnetic shield located between the first and second antennas, the electromagnetic shield having a first side facing the first antenna and a second side facing the second antenna,
a logic component configured to be operationally coupled to the first and second antennas in conjunction with use of the mobile telecommunication device on the aircraft;
wherein the electromagnetic shield is configured to reflect electromagnetic radiation impinging on the first side such that at least a portion of the radiation impinging thereon is reflected towards the first antenna so that, in conjunction with use of the mobile telecommunication device on the aircraft, the first antenna has higher antenna gain than the second antenna in a rear direction of the aircraft, wherein the electromagnetic shield is configured to reflect electromagnetic radiation impinging on the second side such that at least a portion of the radiation impinging thereon is reflected towards the second antenna so that, in conjunction with use of the mobile telecommunication device on the aircraft, the second antenna has higher antenna gain than the first antenna in a forward direction of the aircraft, wherein the electromagnetic shield is configured to at least partially shield the second antenna from receiving radio signals transmitted by the first antenna and to at least partially shield the first antenna from receiving radio signals transmitted by the second antenna;

wherein, in conjunction with use of the mobile telecommunication device on the aircraft, the logic component is configured to select whether the first antenna or the second antenna is used for transmissions via a reverse link of a telecommunication connection with a base station located on the ground based at least in part on information indicative of improved reverse link communications via the selected antenna.

2. Mobile telecommunication device according to claim 1, wherein the electromagnetic shield comprises at least one of a metal, a netting structure, and carbon fibers.

3. Mobile telecommunication device according to claim 1, wherein the first side of the electromagnetic shield forms a concave curved shape facing the first antenna.

4. Mobile telecommunication device according to claim 1, wherein at least a portion of the electromagnetic shield comprises a portion of the aircraft.

5. Mobile telecommunication device according to claim 1, wherein the logic component selects whether the first antenna or the second antenna is used based on location information and/or measurements of signal power, signal quality, timing advance and/or Doppler shift of the first and second antennas.

6. Mobile telecommunication device according to claim 1, further comprising
a storage device configured to store a database, the database comprising location information about a plurality of base stations.

7. An aircraft, comprising
a mobile telecommunication device configured to communicate with one or more base station, the mobile telecommunication device comprising:
at least first and second antennas, wherein the first and second antennas are configured to be positioned on the aircraft with the second antenna located more to a front part of the aircraft than the first antenna,
an electromagnetic shield located between the first and second antennas, the electromagnetic shield having a first side facing the first antenna and a second side facing the second antenna, and
a logic component configured to be operationally coupled to the first and second antennas in conjunction with use of the mobile telecommunication device on the aircraft,
wherein the electromagnetic shield is configured to reflect electromagnetic radiation impinging on the first side such that at least a portion of the radiation impinging thereon is reflected towards the first antenna so that, in conjunction with use of the mobile telecommunication device on the aircraft, the first antenna has higher antenna gain than the second antenna in a rear direction of the aircraft, wherein the electromagnetic shield is configured to reflect electromagnetic radiation impinging on the second side such that at least a portion of the radiation impinging thereon is reflected towards the second antenna so that, in conjunction with use of the mobile telecommunication device on the aircraft, the second antenna has higher antenna gain than the first antenna in a forward direction of the aircraft, wherein the electromagnetic shield is configured to at least partially shield the second antenna from receiving radio signals transmitted by the first antenna and to at least partially shield the first antenna from receiving radio signals transmitted by the second antenna, wherein the first and second antennas are configured to transmit and receive telecommunication signals of the same frequency band, wherein, in conjunction with use of the mobile telecommunication device on the aircraft, the logic component is configured to select whether the first antenna or the second antenna is used for transmissions via a reverse link of a telecommunication connection with a ground base station based at least in part on information indicative of improved reverse link communications via the selected antenna.

8. A system comprising:
the mobile telecommunication device according to claim 1 and
a base station, comprising
a transceiver device; and
a telecommunication processor configured to establish a telecommunication connection with the mobile telecommunication device in conjunction with use of the mobile telecommunication device on the aircraft;
wherein the transceiver device is configured to receive location information, signal power, signal quality, timing advance and/or Doppler shift of a radio signal transmitted from the mobile telecommunication device in conjunction with use of the mobile telecommunication device on the aircraft;
wherein, in conjunction with use of the mobile telecommunication device on the aircraft, the telecommunication processor is configured to select whether the first antenna or the second antenna of the mobile telecommunication device is to be used for transmissions via a reverse link of the telecommunication connection based at least in part on the location information, signal power, signal quality, timing advance and/or Doppler shift; and
wherein, in conjunction with use of the mobile telecommunication device on the aircraft, the transceiver device is configured to transmit a control signal to the mobile telecommunication device indicative of which of the first antenna or the second antenna is to be used by the mobile telecommunication device for transmissions via the reverse link of the telecommunication connection.

9. A system, comprising:
a mobile telecommunication device configured for use on an aircraft, the mobile telecommunication device comprising:
at least first and second antennas configured to communication with one or more base station located on the ground; and
an electromagnetic shield located between the first and second antennas, the electromagnetic shield having a first side facing the first antenna and a second side facing the second antenna,
wherein the mobile telecommunication device is configured such that the first antenna has higher gain than the second antenna in a rear direction of the aircraft and the second antenna has higher gain than the first antenna in a forward direction of the aircraft; and a base station configured for use on the ground, the base station comprising:

a transceiver device; and a telecommunication processor configured to establish a telecommunication connection with the mobile telecommunication device;

wherein the transceiver device is configured to receive location information, signal power, signal quality, timing advance and/or Doppler shift of a radio signal transmitted from the mobile telecommunication device;

wherein the telecommunication processor is configured to select whether the first antenna or the second antenna of the mobile telecommunication device is to be used for transmissions via a reverse link of the telecommunication connection based on the location information, signal power, signal quality, timing advance and/or Doppler shift; and wherein the transceiver device is configured to transmit a control signal to the mobile telecommunication device, the control signal being indicative of which of the first antenna or the second antenna is to be used by the mobile telecommunication device for transmissions via the reverse link of in conjunction with establishing the telecommunication connection.

10. The system according to claim 9, wherein the telecommunication processor is configured to determine the location information of the mobile telecommunication device and/or perform measurements of the signal power, signal quality, timing advance and/or Doppler shift of a radio signal received from the mobile telecommunication device.

11. A method for establishing a telecommunication connection between a mobile telecommunication device and a base station, comprising:

determining location information for a mobile telecommunication device positioned on an aircraft, wherein the mobile telecommunication device includes at least first and second antennas configured to communicate with one or more base station located on the ground, wherein the mobile telecommunication device includes an electromagnetic shield located between the first and second antennas, the electromagnetic shield having a first side facing the first antenna and a second side facing the second antenna, wherein the mobile telecommunication device is configured such that the first antenna has higher gain than the second antenna in a rear direction of the aircraft and the second antenna has higher gain than the first antenna in a forward direction of the aircraft;

performing measurements of signal power, signal quality, timing advance and/or Doppler shift for the first and second antennas of the mobile telecommunication device;

selecting whether to use the first antenna or the second antenna for transmissions via a reverse link of a telecommunication connection based on the location information and/or the measurements of signal power, signal quality, timing advance and/or Doppler shift;

determining, by reading base station location information from a database, a first base station with which to establish the telecommunication connection; and establishing the telecommunication connection between the mobile telecommunication device and the first base station apparatus using the selected antenna for transmissions via the reverse link of the telecommunication connection;

wherein the mobile telecommunication device or at least one base station of the one or more base station determines the location information.

12. The method of claim 11, wherein the mobile telecommunication device determines the location information, measures the signal power, signal quality, timing advance and/or Doppler shift of the first and second antennas, and selects whether the first antenna or the second antenna is used for the telecommunication connection.

13. The method of claim 11, wherein the mobile telecommunication device determines the location information for the mobile telecommunication device, the method further comprising:

sending the location information for the mobile telecommunication device to the first base station;

wherein the first base station selects whether the first antenna or the second antenna is used for transmissions via the reverse link of the telecommunication connection after receiving the location information for the mobile telecommunication device, and/or after having performed measurements of the signal power, signal quality, timing advance and/or Doppler shift of a radio signal transmitted from the mobile telecommunication device; and wherein the first base station sends a control signal to the mobile telecommunication device, the control signal being indicative of which of the first antenna or the second antenna is to be used for transmissions via the reverse link of the telecommunication connection.

14. The method of claim 11, wherein the first base station determines the location information for the mobile telecommunication device and/or measures the signal power, signal quality, timing advance and/or Doppler shift of radio signals transmitted from the mobile telecommunication device, the method further comprising:

selecting whether to use the first antenna or the second antenna for transmissions via the reverse link of the telecommunication connection after having determined the location information for the mobile telecommunication device, and/or after having measured the signal power, signal quality, timing advance and/or Doppler shift of the radio signals transmitted from the mobile telecommunication device; and sending a control signal to the mobile telecommunication device, the control signal being indicative of which of the first antenna or second antenna is to be used for transmissions via the reverse link of the telecommunication connection.

15. The method of claim 11, further comprising:

transmitting a control signal from the first base station to a target base station in conjunction with initiation of a handover of the mobile telecommunication device from the first base station to the target base station, the control signal being indicative of the location information, signal power, signal quality, timing advance and/or Doppler shift of the first and second antennas; and transmitting a handover command from the first base station to the mobile telecommunication device, the handover command being indicative of performing the handover of the mobile telecommunication device from the first base station to the target base station.

16. The mobile telecommunication device of claim 1 wherein the first and second antennas are configured to transmit and receive telecommunication signals of the same frequency band.

17. The mobile telecommunication device of claim 3 wherein the first side of the electromagnetic shield is curved in at least two dimensions.

18. The mobile telecommunication device of claim 17 wherein the curved shape of the first side of the electromagnetic shield forms a concave quarter sphere.

19. The mobile telecommunication device of claim 17 wherein the first side of the electromagnetic shield is curved in at least three dimensions;
   wherein the curved shape of the first side of the electromagnetic shield forms a concave half sphere.

20. The mobile telecommunication device of claim 3 wherein the second side of the electromagnetic shield forms a concave curved shape facing the second antenna.

* * * * *